United States Patent [19]
Kawamura

[11] Patent Number: 5,890,145
[45] Date of Patent: Mar. 30, 1999

[54] COOPERATIVE REASONING APPARATUS

[75] Inventor: Takahiro Kawamura, Yokohama, Japan

[73] Assignee: Kabushiki Kaisha Toshiba, Kawasaki, Japan

[21] Appl. No.: 622,423

[22] Filed: Mar. 27, 1996

[30] Foreign Application Priority Data

Mar. 30, 1995 [JP] Japan .................................. 7-072668

[51] Int. Cl.⁶ .................................................. G06F 15/18
[52] U.S. Cl. .............................................. 706/46; 706/10
[58] Field of Search ....................... 395/11, 911; 706/46, 706/10

[56] References Cited

U.S. PATENT DOCUMENTS

| | | | |
|---|---|---|---|
| 5,224,206 | 6/1993 | Simoudis | 395/51 |
| 5,412,802 | 5/1995 | Fujinami et al. | 395/64 |
| 5,517,405 | 5/1996 | McAndrew et al. | 395/924 |

FOREIGN PATENT DOCUMENTS

| | | |
|---|---|---|
| 5-204649 | 8/1993 | Japan . |
| 5-314070 | 11/1993 | Japan . |

*Primary Examiner*—George B. Davis
*Attorney, Agent, or Firm*—Banner & Witcoff, Ltd.

[57] ABSTRACT

In a cooperative reasoning apparatus comprises a plurality of problem solving units for cooperatively solving various problems and replication unit for replicating a corresponding problem solving unit in responsive to a replication request from one of the plurality of problem solving units, each problem solving unit determines whether or not its own reasoning unit has an ability of reasoning a given problem. If NO, the problem solving unit requests another problem solving unit to solve the problem. Further, each problem solving unit determines whether or not its own reasoning unit is performing reasoning of another problem. If YES, the problem solving unit requests the replication unit to replicate the problem solving unit, so that the problem is solved by the replicate.

19 Claims, 14 Drawing Sheets

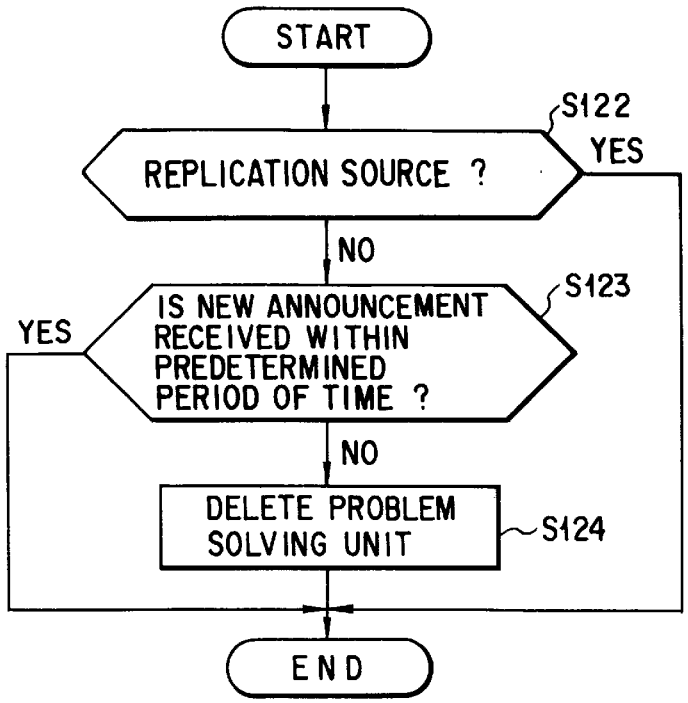
F I G. 12
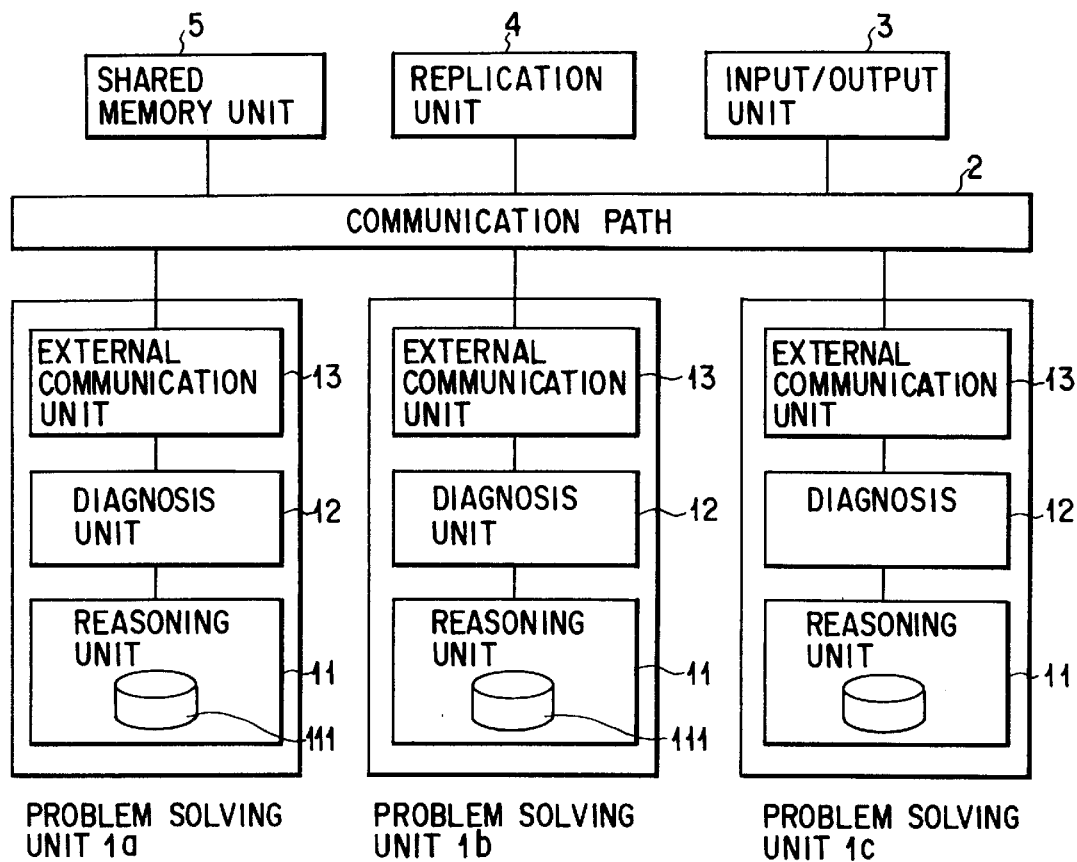
F I G. 13

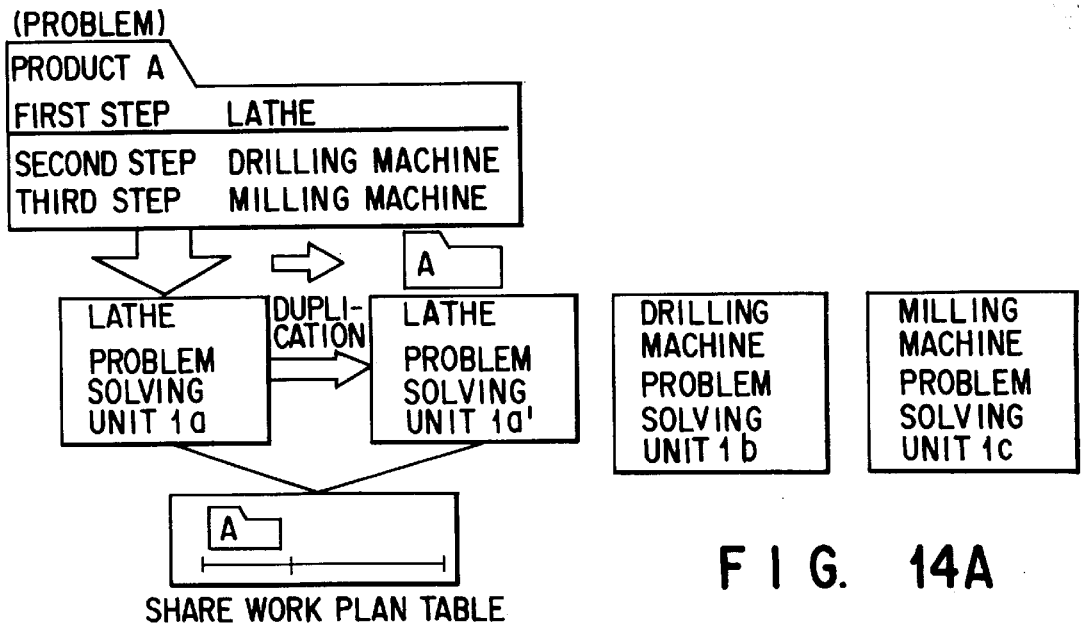
F I G. 14A
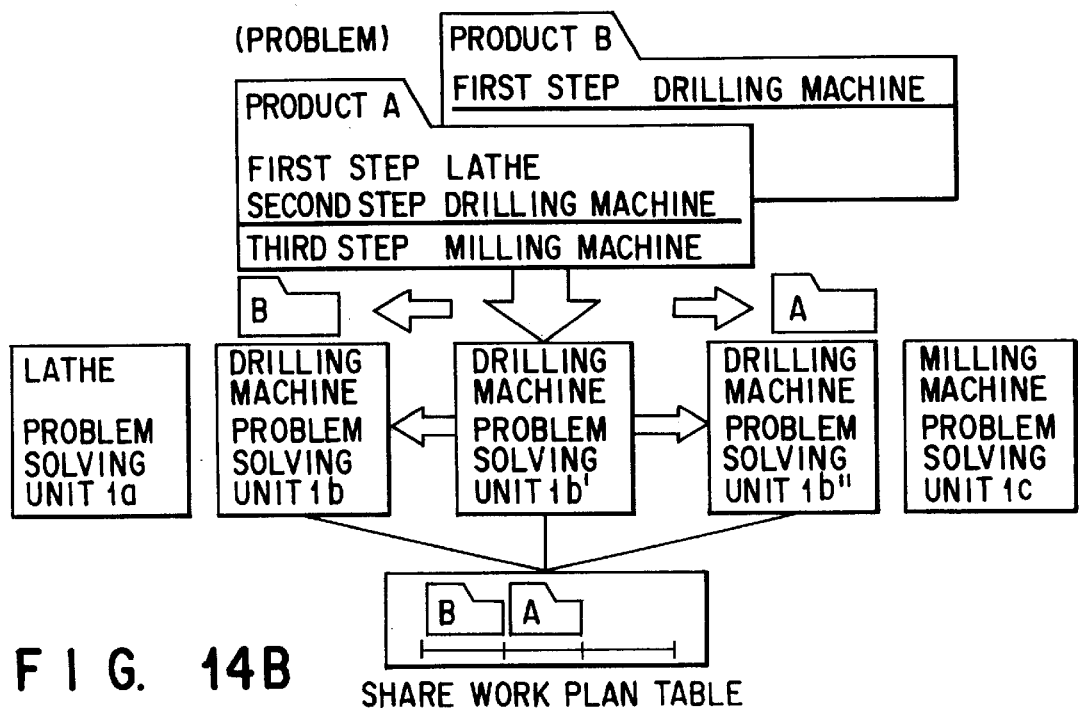
F I G. 14B
 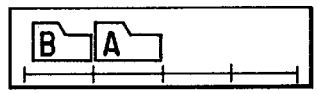 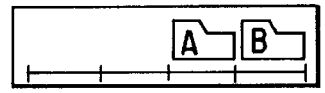
WORK PLAN TABLE OF LATHE | WORK PLAN TABLE OF DRILLING MACHINE | WORK PLAN TABLE OF MILLING MACHINE
F I G. 14C

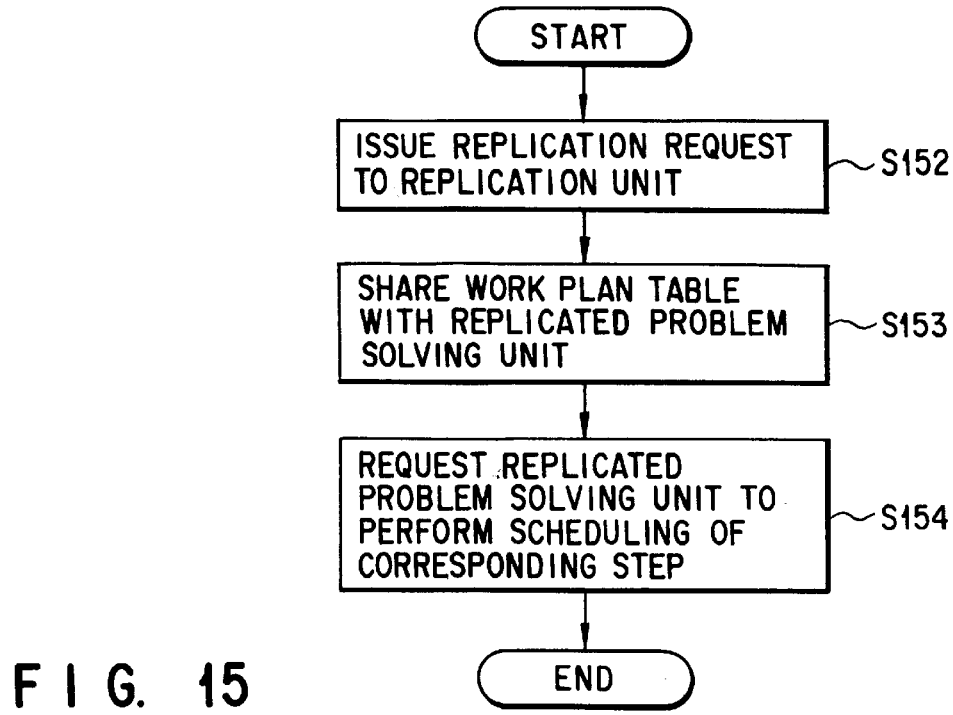
F I G. 15
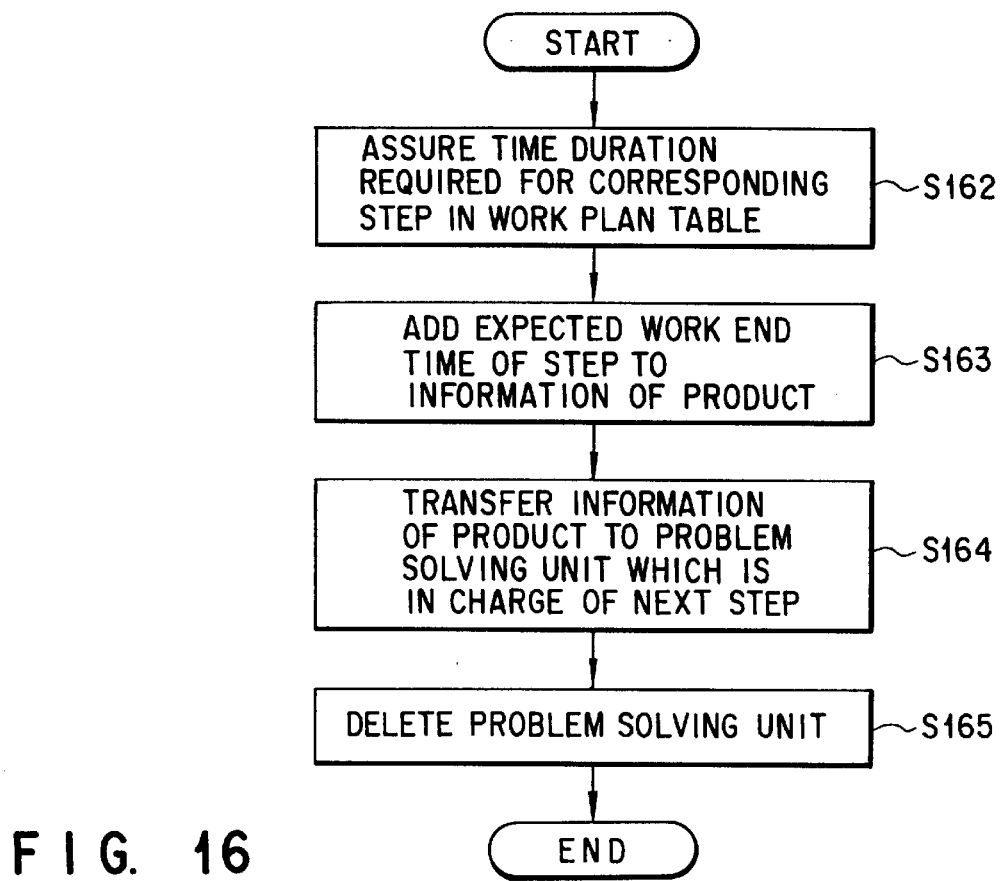
F I G. 16

COOPERATIVE REASONING APPARATUS

BACKGROUND OF THE INVENTION

1. Field of the Invention

The present invention relates to a cooperative reasoning apparatus.

2. Description of the Related Art

As an example of a cooperative reasoning apparatus, a cooperative reasoning apparatus based on a contract network is known. A contract network type reasoning apparatus is normally constituted by problem solving units having different reasoning knowledge data. When a problem to be solved is given to one problem solving unit in the contract network type reasoning apparatus, the problem solving unit performs reasoning using its own reasoning knowledge and attempts to solve the problem. The problem solving unit solves a part, that can be solved by itself, of the given problem using its own reasoning knowledge, but announces to the remaining problem solving units using a communication unit that they solve an unsolved part which cannot be solved by itself. The remaining problem solving units determine whether or not they offer a bid for the announced contents. The announced problem solving unit selects and accepts an appropriate bid. Also, the accepted problem solving unit can announce, to other units, a problem that cannot be solved by itself.

When some problem solving processing is performed using such a cooperative reasoning apparatus, processing may be concentrated on some specific problem solving units but may not be concentrated on some other specific problem solving units depending on the nature of the problem. Since a problem solving unit which is currently processing some partial problem cannot respond to a reasoning processing demand from another problem solving unit, the problem solving unit as a reasoning request source must wait for the end of the processing of the request destination. That is, a specific problem solving unit becomes a bottleneck in the whole reasoning processing.

More specifically, since the contract network includes only a limited number of problem solving units which perform some kinds of reasoning, if the nature of a given problem largely depends on a specific problem solving unit, processing is concentrated on the specific one of a plurality of problem solving units, and the entire reasoning speed is limited there.

In a distributed computer environment such as a conventional computer network, when reasoning processing is to be requested to a problem solving unit which is performing some other processing, in one method, the request source of the reasoning processing, or a management means or the like replicates the problem solving unit, and requests the replicated problem solving unit to perform the reasoning processing. In another method, a predetermined number of problem solving units may be prepared in advance and may be set in a standby state.

However, in the method in which the request source of the reasoning processing or management means determines whether or not the problem solving unit is to be replicated, the request source of the reasoning processing or management means must collect information (such as operating ratio) associated with a target reasoning apparatus, and this method is not preferable in terms of concentration of information and an increase in communication cost. Furthermore, a situation may change during research and determination associated with the target reasoning apparatus, and a proper determination cannot always be made. On the other hand, in the method of preparing a predetermined number of problem solving units in advance, the computer resource is wasted unless the problem solving units are used. On the contrary, if a larger number of reasoning processing demands than expected are concentrated, similar problems are posed.

SUMMARY OF THE INVENTION

It is, therefore, an object of the present invention to provide a cooperative reasoning apparatus which can avoid a high load from being imposed on a specific one of a plurality of problem solving units.

It is another object of the present invention to provide a cooperative reasoning apparatus which can avoid many reasoning processing operations from being concentrated on a specific one of a plurality of problem solving units.

It is still another object of the present invention to provide a cooperative reasoning apparatus which can avoid many reasoning processing operations from being concentrated on a problem solving unit as a request source.

It is still another object of the present invention to provide a cooperative reasoning apparatus which can avoid many reasoning processing operations from being concentrated on a problem solving unit as a request destination.

It is still another object of the present invention to provide a cooperative reasoning apparatus which can attain high-speed problem solving processing.

According to the first aspect of the present invention, a cooperative reasoning apparatus comprises a plurality of problem solving means for cooperatively solving various problems; and replication means for replicating a corresponding problem solving means in responsive to a replication request from one of the plurality of problem solving means, each of the plurality of problem solving means comprising reasoning means which can perform reasoning as to specific problems; and diagnosis means comprising first determining means for, when a first problem of the various problems is inputted, determining whether or not the reasoning means has an ability of reasoning the first problem; means for, when the first determining means determines that the reasoning means has the ability of reasoning the first problem, instructing the reasoning means to reason the first problem; means for, when the first determining means determines that the reasoning means does not have the ability of reasoning the first problem, requesting another problem solving means to solve the first problem; second determining means for, in responsive to a solution request of a second problem from another problem solving means, determining whether or not the reasoning means is performing reasoning of another problem; means for, when the second determining means determines that the reasoning means is not performing reasoning of the another problem, instructing the reasoning means to reason the second problem; means for, when the second determining means determines that the reasoning means is performing reasoning of the another problem, requesting the replication means to replicate the problem solving means; and means for requesting the problem solving means replicated by the replication means to solve the second problem.

Note that the apparatus may further comprise a shared memory for simultaneously storing the numbers of problems which are requested to solve for the problem solving means as a replication source and the replicated problem solving means. The replication means may comprise means for omitting replication of the diagnosis means included in the problem solving means as the replication source in replicating the problem solving means as the replication source. In this case, the diagnosis means included in the problem solving means as the replication source is shared by the problem solving means as the replication source and the replicated problem solving means. The problem solving means replicated by the replication means may be deleted after the problem solving means solves the problem requested to solve.

According to the second aspect of the present invention, a cooperative reasoning apparatus comprises a plurality of problem solving means for cooperatively solving various problems; and replication means for replicating a corresponding problem solving means in responsive to a replication request from one of the plurality of problem solving means, first problem solving means of the plurality of problem solving means, comprising first reasoning means which can perform reasoning as to specific problems; first determining means for, when a problem of the various problems is inputted, determining whether or not the reasoning means has an ability of reasoning the problem; means for, when the first determining means determines that the reasoning means has the ability of reasoning the problem, instructing the first reasoning means to reason the problem; and means for, when the first determining means determines that the reasoning means does not have the ability of reasoning the problem, requesting another problem solving means to solve the problem, and second problem solving means of the plurality of problem solving means, comprising second reasoning means which can perform reasoning as to specific problems; second determining means for, in responsive to a solution request of the problem from the first problem solving means, determining whether or not the reasoning means is performing reasoning of another problem; means for, when the second determining means determines that the reasoning means is not performing reasoning of the another problem, instructing the second reasoning means to reason the problem; means for, when the second determining means determines that the reasoning means is performing reasoning of the another problem, requesting the replication means to replicate the second problem solving means; and means for requesting the problem solving means replicated by the replication means to solve the problem.

Note that the apparatus may further comprise a shared memory for simultaneously storing the numbers of problems which are requested to solve for the second problem solving means and the plurality of problem solving means. The replication means may comprise means for omitting replication of diagnosis means included in the second problem solving means in replicating the second problem solving means. In this case, the diagnosis means included in the second problem solving means is shared by the second problem solving means and the replicated problem solving means. The problem solving means replicated by the replication means may be deleted after the problem solving means solves the problem requested to solve.

According to the third aspect of the present invention, a cooperative reasoning apparatus comprises a plurality of problem solving means for cooperatively solving various problems; and replication means for replicating a corresponding problem solving means in responsive to a replication request from one of the plurality of problem solving means, first problem solving means of the plurality of problem solving means, comprising first reasoning means which can perform reasoning as to specific problems; first determining means for, when a problem of the various problems is inputted, determining whether or not the reasoning means has an ability of reasoning the problem; means for, when the first determining means determines that the reasoning means has the ability of reasoning the problem, instructing the first reasoning means to reason the problem; announcing means for, when the first determining means determines that the first reasoning means does not have the ability of reasoning the problem, announcing the problem to be solved by another problem solving means; bid accepting means for accepting a bid offered by a predetermined one of the problem solving means that offered bids for the problem announced by the announcing means; and means for requesting the problem solving means whose bid is accepted by the bid accepting means to solve the problem, and second problem solving means of the plurality of problem solving means, comprising second reasoning means which can perform reasoning as to specific problems; second determining means for, in accordance with the problem announced by the first problem solving means, determining whether the second reasoning means has an ability of solving the problem; bid offering means for, when the second determining means determines that the second reasoning means has the ability of solving the problem, offering a bid for the problem announced by the first problem solving means; third determining means for, in responsive to a solution request from the first problem solving means that accepts the bid offered by the bid offering means, determining whether or not the second reasoning means is performing reasoning of another problem; means for, when the third determining means determines that the second reasoning means is not performing reasoning of the another problem, instructing the second reasoning means to reason the problem; means for, when the third determining means determines that the second reasoning means is performing reasoning of the another problem, requesting the replication means to replicate the second problem solving means; and means for requesting the problem solving means replicated by the replication means to solve the problem.

Note that the apparatus may further comprise a shared memory for simultaneously storing the numbers of problems which are requested to solve for the second problem solving means and the plurality of problem solving means. The replication means may comprise means for omitting replication of diagnosis means included in the second problem solving means in replicating the second problem solving means. In this case, the diagnosis means included in the second problem solving means is shared by the second problem solving means and the replicated problem solving means. The problem solving means replicated by the replication means may be deleted after the problem solving means solves the problem requested to solve.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIG. 12 is a flow chart for explaining an example of deletion processing by a diagnosis unit shown in FIG. 11;

FIG. 13 is a block diagram showing the arrangement of a cooperative reasoning apparatus according to the fourth embodiment of the present invention;

FIGS. 14A, 14B and 14C are charts showing the processing procedure of a production scheduling problem;

FIG. 15 is a flow chart for explaining the operation flow of a problem solving unit 1a;

FIG. 16 is a flow chart for explaining the operation flow of a problem solving unit 1a' as a replicated unit of the problem solving unit 1a;

DETAILED DESCRIPTION OF THE PREFERRED EMBODIMENTS

The preferred embodiments of the present invention will be described hereinafter with reference to the accompanying drawings.

(First Embodiment)

Figure 1:
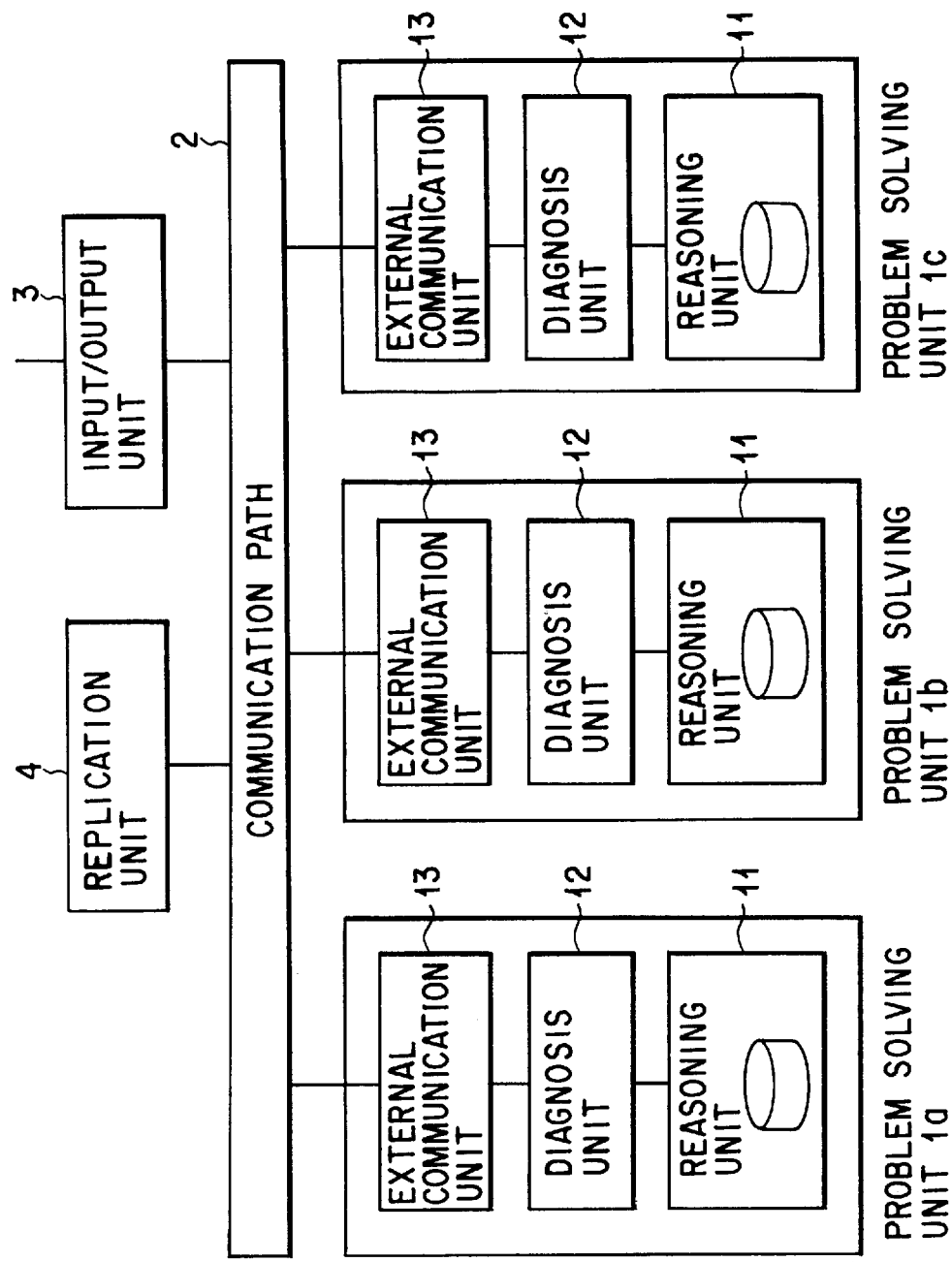
FIG. 1 is a block diagram showing the arrangement of a cooperative reasoning apparatus according to the first embodiment of the present invention.

FIG. 1 is a block diagram showing the arrangement of a cooperative reasoning apparatus according to the first embodiment of the present invention. Referring to FIG. 1, problem solving units 1a, 1b, and 1c (these units will be generally referred to as [problem solving units 1] hereinafter; the same applies to the following description) are connected to each other via a communication path 2, and are also connected to an input/output unit 3 and a replication unit 4 via the communication path 2.

Each of the problem solving units 1 comprises a reasoning unit 11, a diagnosis unit 12, and an external communication unit 13. The reasoning unit 11 comprises a knowledge memory 111 which stores predetermined knowledge, and an inference engine (not shown) for performing actual inference on the basis of the contents of the knowledge memory. In this embodiment, the reasoning units 11 of the problem solving units 1a, 1b, and 1c respectively perform different kinds of reasoning. The diagnosis unit 12 determines whether or not it offers a bid for a problem announced by another problem solving unit other than its own unit. When the bid is accepted, the unit 12 determines whether or not it answers to the problem. Then, the unit 12 performs various kinds of processing in accordance with its determination results, as will be described in detail later. The external communication unit 13 comprises a mechanism for making communications with other problem solving units and the replication unit 4 via the communication path 2.

The input/output unit 3 allows an interactive operation with a user, and may be an interface for exchanging information with other systems.

The replication unit 4 replicates the problem solving unit 1 as a request source in accordance with a request from one of the diagnosis units 12 in the problem solving units 1.

The operation of the cooperative reasoning apparatus with the above-mentioned arrangement will be described below. A case will be explained below wherein the cooperative reasoning apparatus is applied to an English-Japanese translation system, and a problem "the apple is lisa" (to be referred to as [problem A] hereinafter) is inputted from the input/output unit 3. The respective problem solving units 1 can perform reasoning in correspondence with respective parts of speech in the English grammar. More specifically, the reasoning units 11 in the problem solving units 1a; , 1b, and 1c can respectively translate nouns, verbs, and articles into Japanese words on the basis of the knowledge data stored in their knowledge memories 111. Each problem solving unit 1 can extract words from a given English sentence, and can construct a Japanese sentence by combining translated words.

Figure 2:
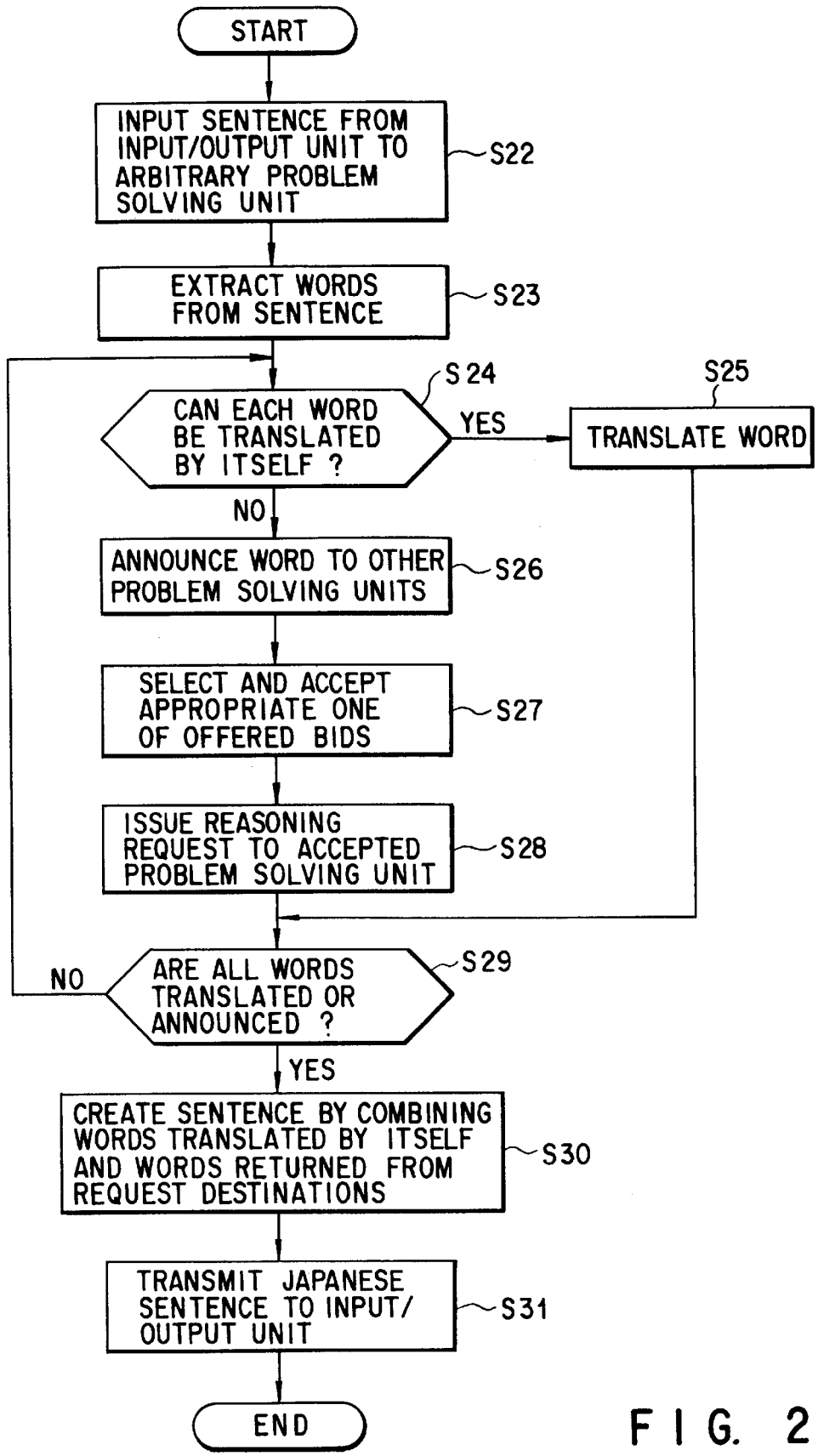
FIG. 2 is a flow chart for explaining the operation flow of a problem solving unit shown in FIG. 1.

FIG. 2 is a flow chart for explaining the operation flow of the problem solving unit. Referring to FIG. 2, problem A is inputted from the input/output unit 3 to an arbitrary problem solving unit (step s22). In this case, assume that problem A is inputted to the problem solving unit 1b. The problem solving unit 1b performs reasoning for the input problem using its own reasoning unit 11 (steps s23 and s24). The problem solving unit 1b can translate a verb "is" of the input problem (step s25), but cannot translate other parts of speech "the", "apple", and "lisa". Thus, the problem solving unit 1b announces the problem that cannot be solved by itself (to be referred to as a [partial problem] hereinafter) for the remaining problem solving units 1a and 1c using the external communication unit 13 (step s26). Assume that the unit 1b announces a partial problem "apple" first. In this case, the unit 1b notifies other problem solving units of a message [announcement, "apple"] via the communication path 2. Other problem solving units determine using their own diagnosis units 12 if they offer a bid for the problem.

Figure 3:
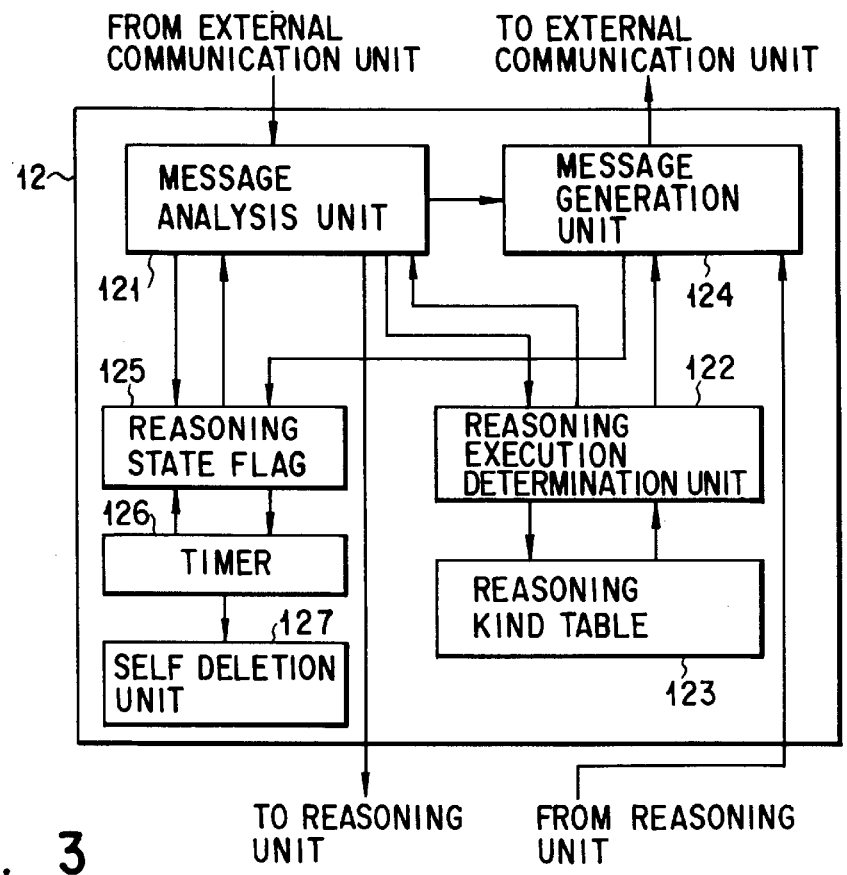
FIG. 3 is a block diagram showing the internal arrangement of a diagnosis unit shown in FIG. 1.

FIG. 3 is a block diagram showing the internal arrangement of the diagnosis unit. Referring to FIG. 3, a message analysis unit 121 analyzes a message sent from the external communication unit, and requests various kinds of processing on the basis of the analysis result. For example, upon reception of the message [announcement, "apple"], the message analysis unit 121 extracts first data from the message. In this case, since the first data is [announcement], the message analysis unit 121 then extracts second data, and transfers it to a reasoning execution determination unit 122. The reasoning execution determination unit 122 looks up a reasoning kind table 123 to check if its own reasoning unit can execute reasoning, and notifies a message generation unit 124 of a message indicating the table look-up result. More specifically, in the example of the English-Japanese translation system, since the parts of speech of words that can be translated by its own reasoning unit 11 are registered in the reasoning kind table 123, the unit 122 analyzes the part of speech of the received second data and collates whether or not the part of speech is registered in the table. As a result of collation, when the part of speech is registered in the reasoning kind table 123, the reasoning execution determination unit 122 notifies the message generation unit 124 of a message indicating that its own reasoning unit can execute reasoning; otherwise, the unit 122 notifies the message generation unit 124 of a message indicating that its own reasoning unit cannot execute reasoning. The message generation unit 124 generates a message to be transferred onto the communication path 2 on the basis of various data sent thereto. For example, when the message generation unit 124 receives a message indicating that its own reasoning unit can execute reasoning for the announced contents (a message indicating announcement is notified from the message analysis unit 121), it generates a message indicating a bit offer, and transfers it to the external communication unit 13. On the other hand, when the unit 124 receives a message indicating that its own reasoning unit cannot execute reasoning, it ignores the message.

A reasoning state flag 125 manages the state as to whether its own reasoning unit 11 is currently executing reasoning in the form of a flag [0] or [1]. More specifically, when a message indicating that reasoning is to be performed is received from the message analysis unit 121, and the problem is transferred to the reasoning unit 11, the reasoning state flag is rewritten to be [1] at the same time. When the reasoning unit 11 has completed reasoning, the message generation unit 124 which received the reasoning result rewrites the reasoning state flag 125 to [0]. The reasoning state flag 125 is looked up by the message analysis unit 121.

A timer 126 monitors the reasoning state flag 125, and when the [0] state of the reasoning state flag 125 has continued for a predetermined period of time, the timer 126 notifies a self deletion unit 127 of a message indicating this. The self deletion unit 127 deletes the problem solving unit itself under a predetermined condition, as will be described in detail later. Note that deletion by means of the self deletion unit 127 may be processed on, e.g., operating system level.

Figure 4:
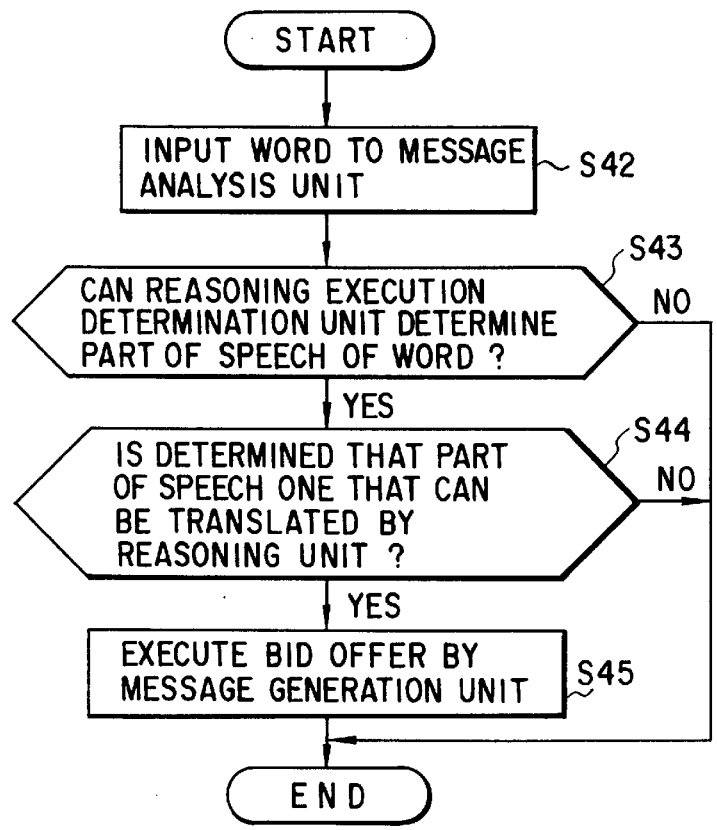
FIG. 4 is a flow chart for explaining the processing flow when the diagnosis unit shown in FIG. 1 receives an announcement.

FIG. 4 is a flow chart for explaining the processing flow when the diagnosis unit receives an announcement. Referring to FIG. 4, a message from another problem solving unit is inputted to the message analysis unit 121 (step s42). The message analysis unit 121 analyzes the message, and transfers a word as the second data to the reasoning execution determination unit 122. The reasoning execution determination unit 122 determines the part of speech of the received word (step s43), and confirms by looking up the reasoning kind table whether or not the word can be translated (step s44). If the unit 122 determines that reasoning can be executed, it notifies the message generation unit 124 of a message indicating this, and the message generation unit 124 transmits a message indicating a bid offer onto the communication path. On the other hand, if the reasoning execution determination unit 122 analyzes that the part of speech cannot be determined, or if the unit 122 determines that the part of speech of the word is one that cannot be translated by reasoning of its own reasoning unit although it is analyzed, the unit 122 notifies the message generation unit of a message indicating this.

Assume that the problem solving unit 1a offers a bid for the problem announced by the problem solving unit 1b via the above-mentioned processing. Note that the bid offer is to state for some announcement that its own problem solving unit solves the partial problem. In this embodiment, the problem solving unit which offers a bid transmits a message [bid offer, problem, its own name] onto the communication path 2. More specifically, in the example of the English-Japanese translation system, a message [bid offer, "apple", 1a] is transferred onto the communication path 2, and the problem solving unit 1b picks up this message.

On the other hand, accepting the bid offer is that the announced problem solving unit selects a specific problem solving unit in accordance with a predetermined criteria. As the criteria for accepting the bid offer, for example, a problem solving unit which offered a bid earliest may be selected. Also, a bid offer message may include an adaptivity for a problem, the problem solving unit may be selected in accordance with the adaptivity. In this case, since only the problem solving unit 1a offers a bid, the problem solving unit 1b selects (accepts the bid offer from) the problem solving unit 1a (step s37 in FIG. 3).

When the bid offer is accepted, the selected problem solving unit receives a reasoning request message, and performs reasoning using its own reasoning unit 11.

Note that a bid is offered and accepted independently of the state of its own reasoning unit 11. Therefore, even when the reasoning unit 11 is executing reasoning, and cannot execute reasoning for another problem, a reasoning request may be received.

In this case, the problem solving unit performs the following operation.

Figure 5:
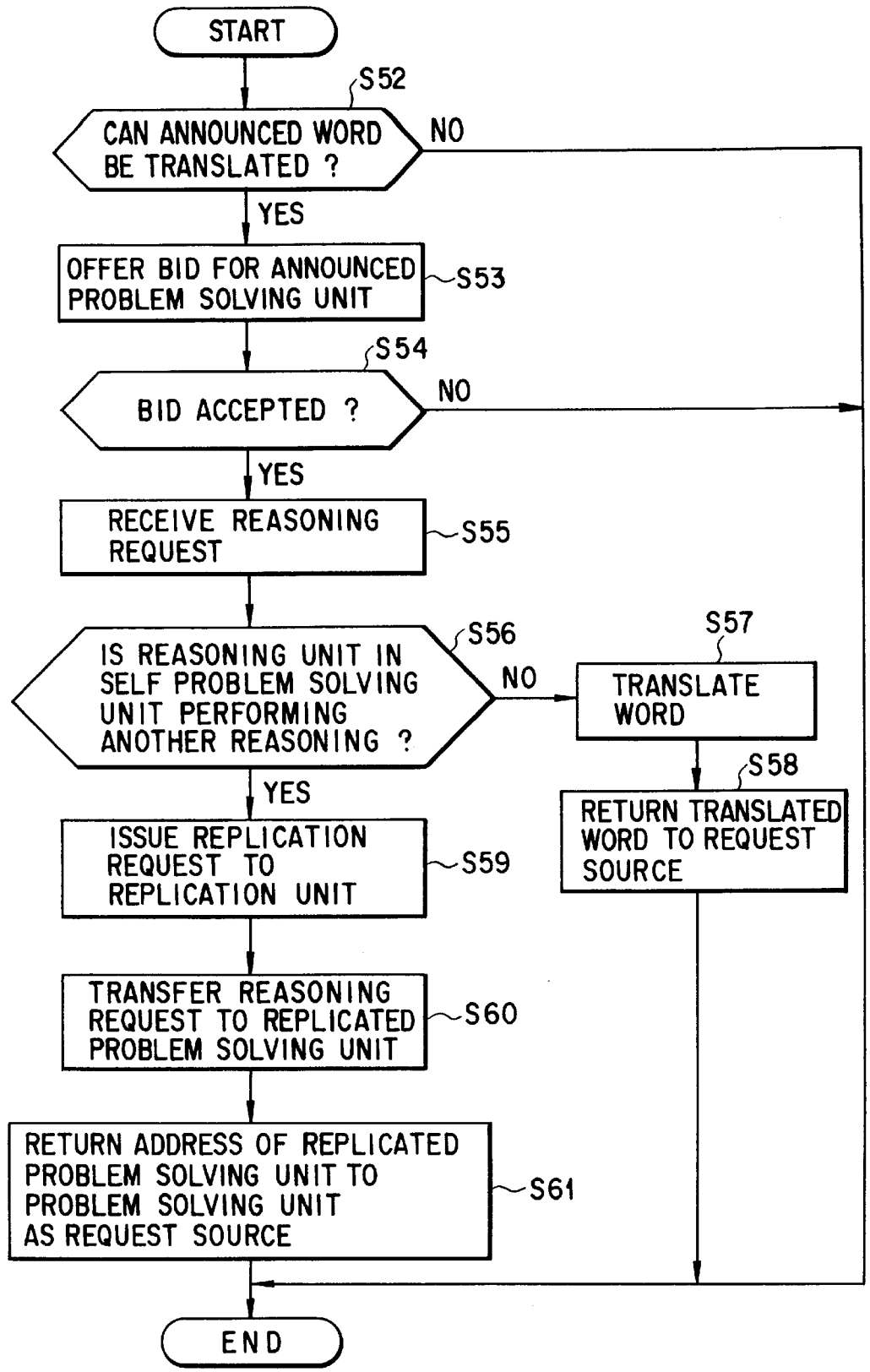
FIG. 5 is a flow chart for explaining the operation when the problem solving unit shown in FIG. 1 receives a plurality of reasoning requests.
Figure 6:
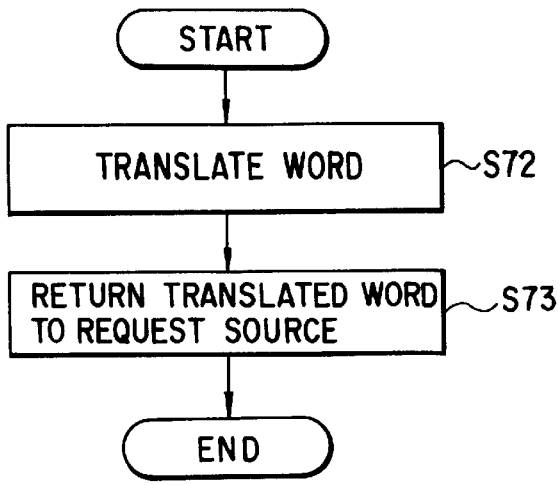
FIG. 6 is a flow chart for explaining the operation when the problem solving unit shown in FIG. 1 receives a plurality of reasoning requests.

FIGS. 5 and 6 are flow charts for explaining the operation when the problem solving unit receives a plurality of reasoning requests.

In the above-mentioned example, after the problem solving unit 1b accepts the bid offered for the partial problem "apple", the problem solving unit 1b announces a partial problem "lisa". Assume that the problem solving unit 1a similarly offers a bid for this problem and this bid offer is accepted (steps s52, s53, s54, and s55 in FIG. 5). However, at this time, the reasoning unit 11 of the problem solving unit 1a performs reasoning processing of the previously accepted partial problem "apple" (step s56). In the diagnosis unit 12, if the message generation unit 124 has not received the reasoning result of the previously accepted problem from the reasoning unit 11, it determines that the reasoning unit is executing reasoning, and requests the replication unit 4 via the external communication unit 13 to replicate its own problem solving unit (step s59). The replication unit 4 replicates another problem solving unit 1a (to be referred to as a [problem solving unit 1a'] hereinafter) having the same reasoning unit as that of the problem solving unit 1a as a request destination, and notifies the diagnosis unit 12 of the problem solving unit 1a as a replicate source of its address. The replication is attained by copying a real body of a program executing on a computer to another position on a main memory.

The diagnosis unit of the problem solving unit 1a requests the newly replicated problem solving unit 1a' to solve the partial problem "lisa" (step s60), and notifies the problem solving unit 1b as an original request destination of the partial problem of the address of the problem solving unit 1a' so as to request it to communicate with the problem solving unit a' thereafter (step s61).

As shown in FIG. 6, when the partial problem and information of the request source are prepared, the problem solving unit 1a' as the request destination performs reasoning for the partial problem to translate the word (step s72), and sends back the reasoning result to the problem solving unit 1a as a request destination (step s73).

Figure 7:
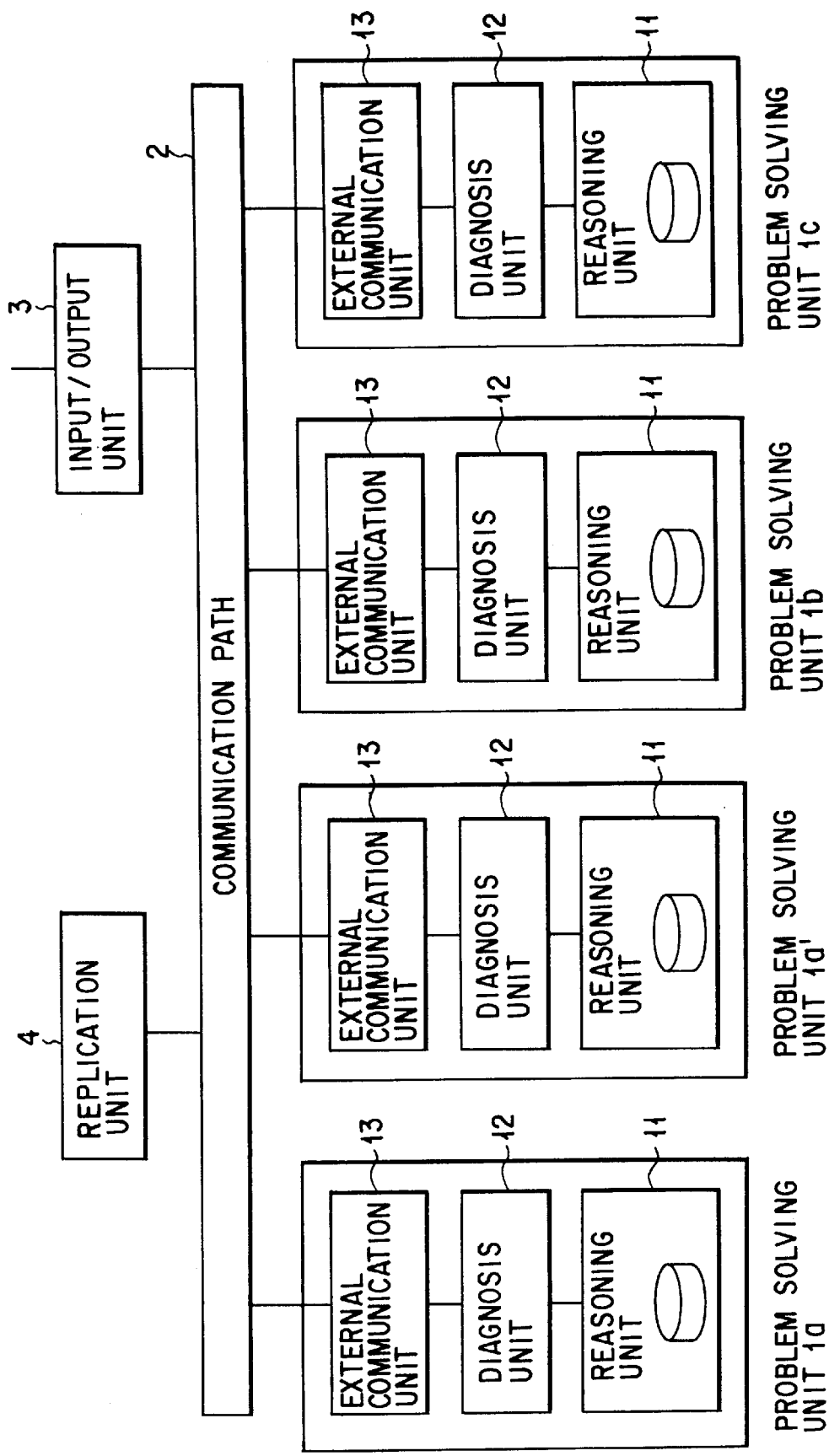
FIG. 7 is a block diagram showing the arrangement of the cooperative reasoning apparatus when a problem solving unit is replicated by a replication unit shown in FIG. 1.

FIG. 7 is a block diagram showing the arrangement of the cooperative reasoning apparatus when the problem solving unit is replicated by the replication unit. More specifically, FIG. 7 shows a state wherein the problem solving unit 1a' is replicated as a replicate of the problem solving unit 1a by the replication unit 4.

As described above, the cooperative reasoning apparatus according to this embodiment reasons a problem, or announces a partial problem, offers and accepts a bid, and makes a replicate as needed, thereby solving the problem (step s29 in FIG. 2).

When a bid offered for the announced partial problem "apple" is accepted, the problem solving unit 1b announces a partial problem "the". The problem solving unit 1c offers a bid for this problem, and the problem solving unit 1b accepts the bid offered by the problem solving unit 1c. Thereafter, the reasoning result [ringo] of the partial problem "apple", the reasoning result [risa] of the partial problem "lisa", and the reasoning result [sono] of the partial problem "the" are returned to the problem solving unit 1b to which the problem was input initially. The problem solving unit 1b generates a final reasoning result [sono ringo wa risa desu.] for problem A on the basis of its grammatical knowledge together with the reasoning result [desu] of the partial problem "is" reasoned by itself (step s30). Upon completion of translation from English to Japanese in this manner, the problem solving unit 1b sends the final reasoning result to the input/output unit (step s31).

Figures 8A, 8B:
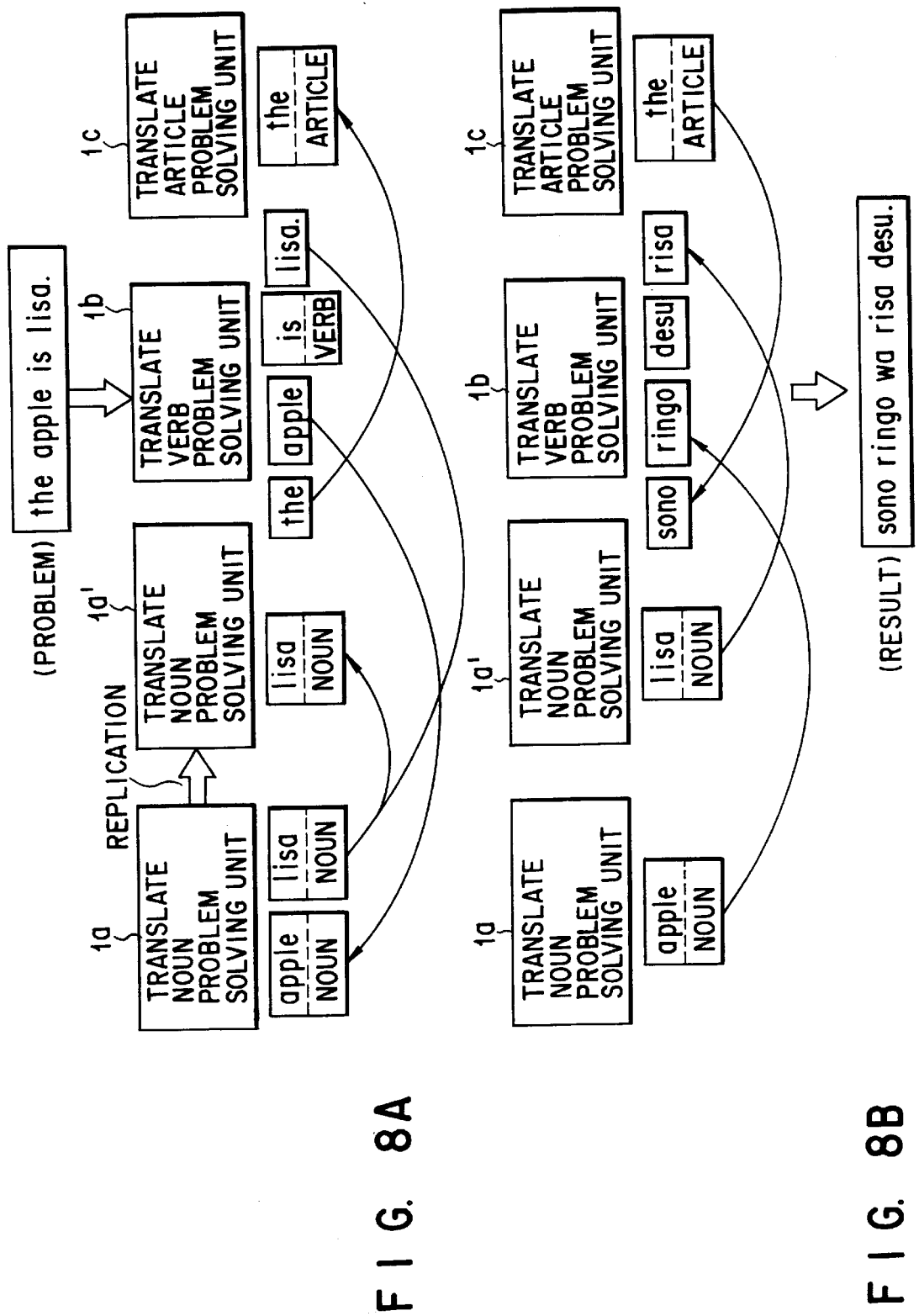
FIGS. 8A and 8B are charts for explaining the flow of processing of a given problem by problem solving units.

FIGS. 8A and 8B are schematic charts showing the processing flow when a problem input from the input/output unit is solved by the problem solving units. More specifically, FIG. 8A shows a state wherein the problem input to the problem solving unit 1b is transferred to other problem solving units as partial problems, and the problem solving unit 1a is replicated to obtain the problem solving unit 1a'. FIG. 8B shows a state wherein the results reasoned by the respective problem solving units are sent back to the problem solving unit 1b, and a final result is output.

Figure 9A:
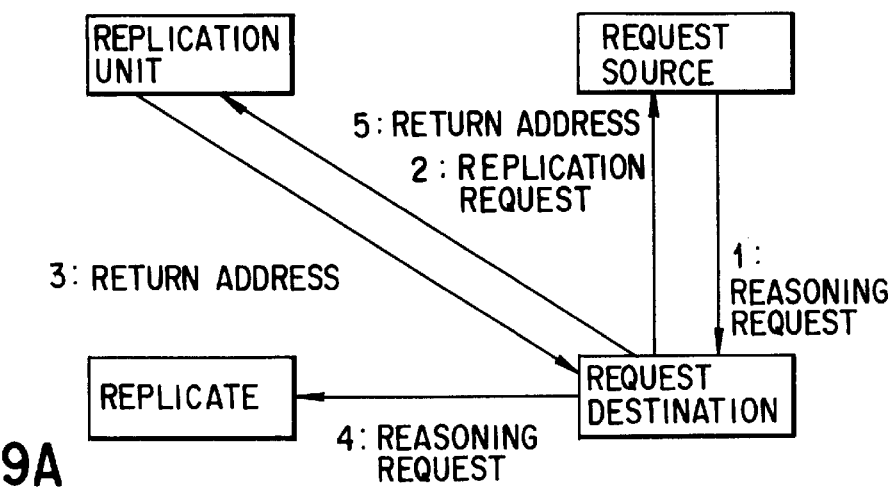
FIGS. 9A and 9B are diagrams for comparing a cooperative reasoning apparatus according to the present invention and a conventional reasoning apparatus.
Figure 9B:
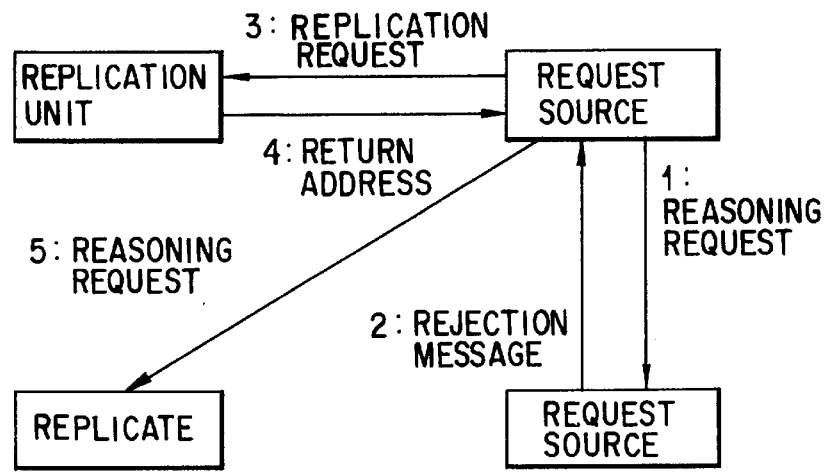

The cooperative reasoning apparatus according to the present invention and the conventional cooperative reasoning apparatus will be compared in terms of their information flows. FIG. 9A shows the information flow among the respective units in the cooperative reasoning apparatus according to the present invention, and FIG. 9B shows the information flow among the respective units in the conventional cooperative reasoning apparatus. That is, FIG. 9B shows a case wherein the request source (corresponding to the problem solving unit 1b of this embodiment) of reasoning processing determines whether or not replication is to be made. More specifically, in FIG. 9B, the problem solving unit 1b requests the problem solving unit 1a to solve a problem. However, since the problem solving unit 1a is currently processing another problem, it sends back a rejection for a new problem request to the problem solving unit 1b or ignores the request. Thus, the problem solving unit 1b requests the replication unit to replicate the problem solving unit 1a. The replication unit generates a problem solving unit 1a', and sends back its address to the problem solving unit 1b. The problem solving unit 1b requests again the problem solving unit 1a' to solve a problem.

As shown in FIG. 9A, according to the cooperative reasoning apparatus of the present invention, communication loads shift from the request source of reasoning processing to a request destination of reasoning processing. In contrast to this, in the conventional cooperative reasoning apparatus shown in FIG. 9B, communication loads are still concentrated on the request source. In general, in a cooperative reasoning apparatus using the contract network, a problem solving unit which initially received a problem from the input/output unit requests reasoning processing. For this reason, in a system in which many communication loads are imposed on the request source of reasoning processing, communications are concentrated there in the entire cooperative reasoning apparatus, resulting in poor efficiency.

As described above, according to the first embodiment, communication loads can be distributed by shifting them to the respective problem solving units as request destinations, the concentration of information and the time delay based thereon can be avoided, thus attaining efficient reasoning.

Note that the replicated problem solving unit can offer a bid for a problem announced by another problem solving unit as in the problem solving unit which requests replication. Also, the replicated problem solving unit can request the replication unit to generate a replicate of itself in accordance with the determination of the diagnosis unit.

(Second Embodiment)

A cooperative reasoning apparatus according to the second embodiment of the present invention will be described below.

Figure 10:
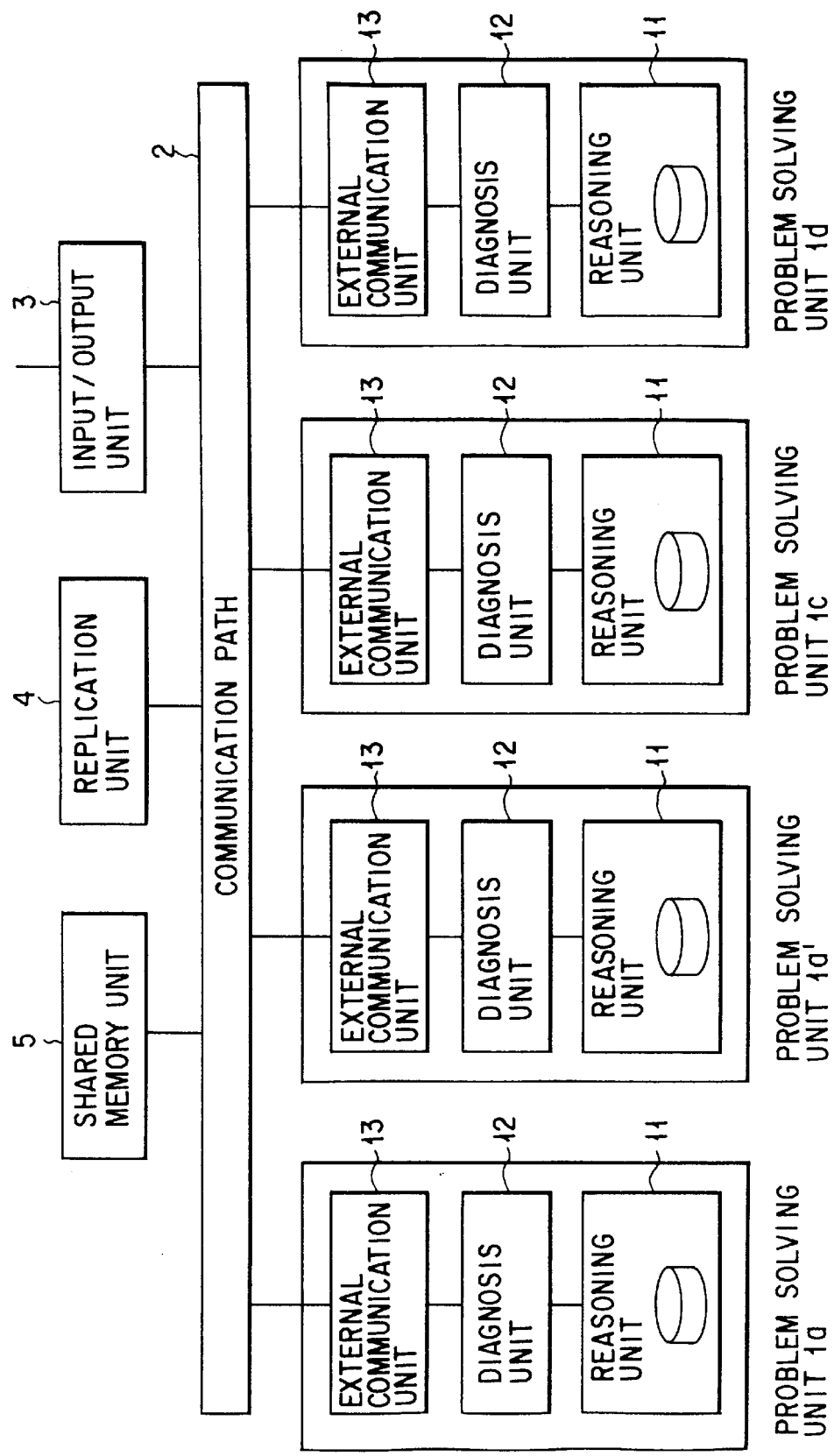
FIG. 10 is a block diagram showing the arrangement of a cooperative reasoning apparatus according to the second embodiment of the present invention.

FIG. 10 is a block diagram showing the arrangement of a cooperative reasoning apparatus according to the second embodiment of the present invention. The cooperative reasoning apparatus of this embodiment further comprises a shared memory unit 5.

Referring to FIG. 10, a problem solving unit 1a' is a replicate of a problem solving unit 1a, and a shared memory unit 5 is connected to a communication path 2. Note that the shared memory unit 5 can be realized by, e.g., a shared memory. The role of the shared memory unit 5 is as follows.

More specifically, when the problem solving unit 1a generates the problem solving unit 1a', using a replication unit 4 in the above embodiment, the number of requested partial problems (in the above example, the number of requested nouns) must be matched between the replicated problem solving unit 1a' and the problem solving unit 1a as its replicate source.

More specifically, the problem solving units 1a and 1a' share a counter using the shared memory unit 5 to avoid the presence of two counters for counting the number of requested partial problems. Thus, each of the problem solving units 1a and 1a' manages the number of requested partial problems in a corresponding area in the shared memory unit 5.

As described above, since the shared memory unit 5 is shared by the problem solving unit 1a and the problem solving unit 1a' as its replicate to store the number of requested partial problems (nouns), matching between the problem solving units 1a and 1a' can be maintained.

(Third Embodiment)

A cooperative reasoning apparatus according to the third embodiment of the present invention will be described below.

When the problem solving unit announces a problem, it must often select bids offered by a plurality of problem solving units having reasoning units for performing the same kind of reasoning (e.g., reasoning units for translating a noun). For example, after a problem solving unit 1a is replicated in the above-mentioned example, there are two problem solving units for translating a noun, and both the problem solving unit 1a and a problem solving unit 1a' as a replicate of the problem solving unit 1a offer bids for an announced problem associated with a noun. Therefore, the announced problem solving unit must select and accept one of the two bid offers.

In this embodiment, in generation of a replicate, a replication unit 4 generates a problem solving unit consisting of only a reasoning unit, so that the replicated problem solving unit shares an external communication unit 13 and a diagnosis unit 12 with the problem solving unit as the replicate source. More specifically, the external communication unit and the diagnosis unit in the problem solving unit in the replicate source manage the reasoning unit in the replicated problem solving unit in addition to its original reasoning unit. With this arrangement, only one bid is offered from the problem solving units having the same kind of reasoning units, and a load on the request source of a problem can be reduced.

Figure 11:
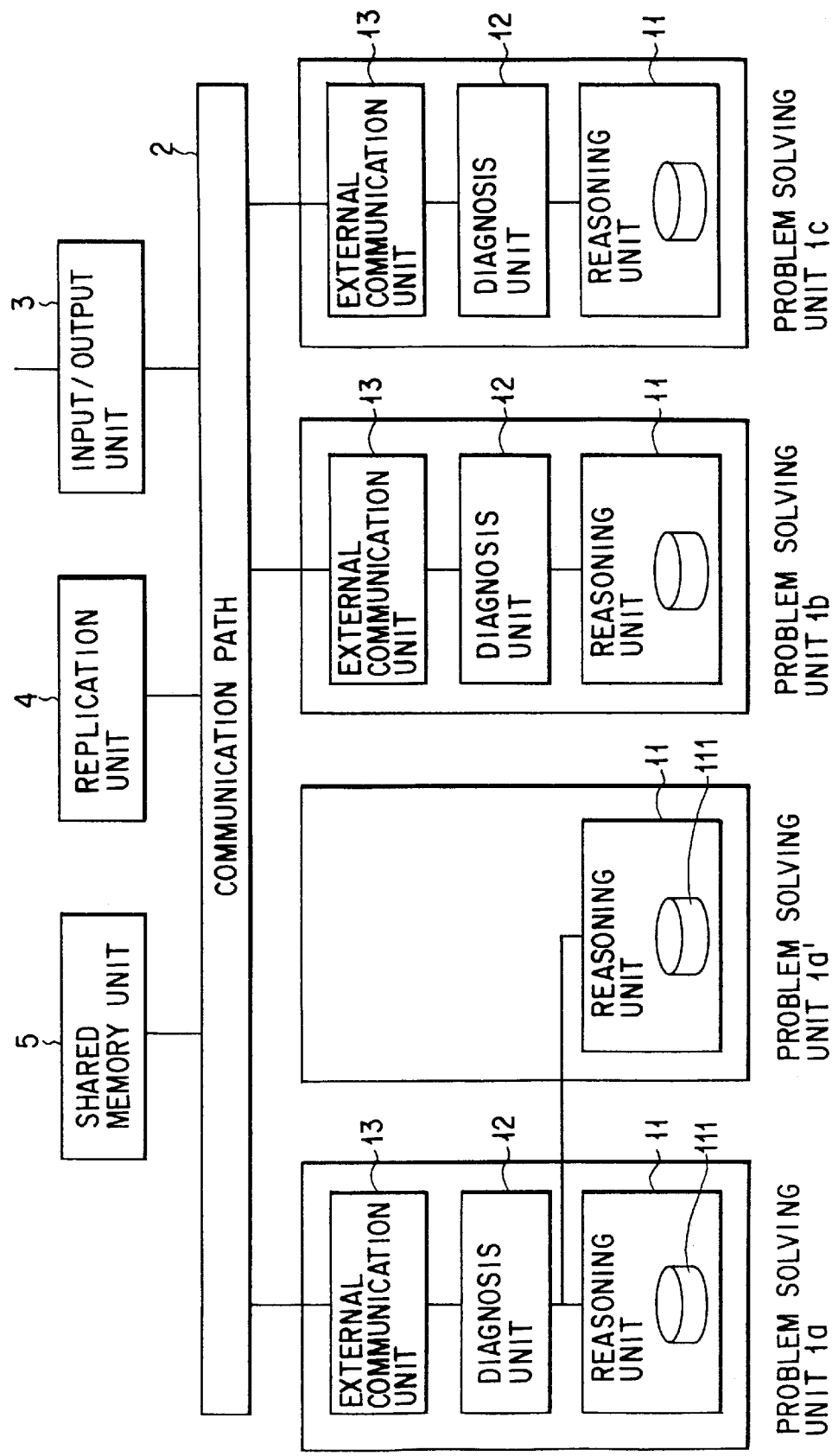
FIG. 11 is a block diagram showing the arrangement of a cooperative reasoning apparatus according to the third embodiment of the present invention.

FIG. 11 is a block diagram showing the arrangement of a cooperative reasoning apparatus according to the third embodiment of the present invention. Referring to FIG. 11, when the problem solving unit 1a requests replication, it requests the replication unit 4 to generate not a replicate of the entire problem solving unit but a replicate of a problem solving unit consisting of a reasoning unit 11 including a knowledge memory 111. The newly generated problem solving unit 1a' is managed by the external communication unit 13 and the diagnosis unit 12 in the problem solving unit 1a. Reasoning processing requested to the problem solving unit 1a is transferred to the problem solving unit 1a'. Even after completion of the requested reasoning processing, the problem solving unit 1a' is managed by the external communication unit 13 and the diagnosis unit 12 in the problem solving unit 1a, and receives reasoning processing accepted by the diagnosis unit 12. Furthermore, when the problem solving unit 1a' consisting of only the reasoning unit does not perform reasoning, the diagnosis unit which manages the unit 1a' notifies an announced problem solving unit 1b of a message indicating this, so that the replicated problem solving unit can be accepted more easily than other problem solving units, thus effectively utilizing the replicated problem solving unit.

The replicated problem solving unit is normally deleted on the basis of the determination result of the diagnosis unit 12 of the problem solving unit as the replicate request source. For example, upon completion of the first requested reasoning, the diagnosis unit 12 of the problem solving unit as the request source deletes the replicated problem solving unit. Alternatively, the replicated problem solving unit may be deleted when it does not perform any reasoning, and no new problem is announced for a predetermined period of time. Also, upon deletion of the replicated problem solving unit, an announcement may be made to other problem solving units, and the replicated problem solving unit may be deleted if no opposition is offered. In this manner, the number of unnecessary problem solving units can be suppressed, and an overloaded state of the computer can be avoided.

FIG. 12 is a flow chart for explaining an example of the operation of deletion processing by the diagnosis unit.

The operation of deletion processing by the diagnosis unit 12 starts upon completion of requested reasoning. Upon completion of reasoning, the diagnosis unit 12 checks if its own problem solving unit is a problem solving unit as a replicate source (which requests replication) or a replicated problem solving unit (step s122). If its own problem solving unit itself is a replicated problem solving unit, the unit 12 checks if a new announcement is received within a predetermined period of time (step s123). If NO in step s123, the diagnosis unit 12 delete the problem solving unit including itself (step s124). Otherwise, i.e., when its own problem solving unit is the replicate source or when the new announcement is received within the predetermined period of time, the unit 12 does not delete the problem solving unit.

As described above, according to the third embodiment, since communication loads can shift from the request source of reasoning processing to the request destination of reasoning processing, the communication loads can be distributed, and the concentration of information and the time delay based thereon can be avoided, thus attaining efficient reasoning.

The cooperative reasoning apparatus according to the present invention is not limited to the above-mentioned English-Japanese translation system but may be applied to various other cooperative reasoning systems.

(Fourth Embodiment)

The fourth embodiment in which a cooperative seasoning apparatus of the present invention is applied to a production scheduling problem will be described below.

Note that the production scheduling problem as a target problem is as follows.

For example, in order to manufacture product A, information representing a manufacturing procedure [first step: cut using lathe (1.5 h), second step: form hole using drilling machine (2.0 h), third step: mill surface using milling machine (1.0 h), time limit for delivery=80 h later, quantity= 10] is inputted from an input/output unit. The same applies to products B and C. On the basis of such information, each of schedulers (system for making a work plan) corresponding to jobs (in this case, work units such as the lathe, drilling machine, milling machine, and the like) assures a required time period in a corresponding work plan table. Note that the required time period is one required for one step×the quantity=10. The work in the second step must be scheduled after the work in the first step, as a matter of course. Also, the work end time in the final step must be before the time limit for delivery=80 h later. As described above, there are some restricting conditions.

FIG. 13 is a block diagram showing the arrangement of a cooperative reasoning apparatus according to the fourth embodiment of the present invention. The apparatus of this embodiment comprises a plurality of (three in FIG. 13) problem solving units 1a, 1b, and 1c. Each of the problem solving units 1a, 1b, and 1c schedules a corresponding machine (the lathe, drilling machine, or milling machine). Other units are the same as those in the above-mentioned embodiments, and a detailed description thereof will be omitted.

FIGS. 14A to 14C and FIG. 15 are views for explaining the operation flow of the problem solving unit according to this embodiment. More specifically, FIGS. 14A to 14C are schematic charts showing the operation flow of the problem solving unit 1a, and FIG. 15 is a flow chart showing the operation flow of the problem solving unit 1a. In this embodiment, assume that the input/output unit 3 inputs information ([first step: cut using lathe (1.5 h)], [second step: form hole using drilling machine (2.0 h)], [third step: mill surface using milling machine (1.0 h), time limit for delivery=80 h later, quantity=10]) associated with product A. Also, assume that each problem solving unit recognizes the correspondence between other problem solving units as schedulers and jobs. Therefore, no processes for announcing a problem, offering a bid for the problem, and accepting the bid offer are performed unlike in the above embodiments, and a scheduling request is directly issued to a corresponding problem solving unit.

Information of product A input from the input/output unit 3 is transferred to the problem solving unit 1a as the scheduler of the lathe since the first step uses the lathe. As soon as the problem solving unit 1a receives the information, it requests the replication unit 4 to replicate a problem solving unit having the same reasoning unit as its own (step s152 in FIG. 15). Furthermore, the problem solving unit 1a shares the work plan table of the lathe using the shared memory unit 5 with the replicated problem solving unit 1a' (step s153). The problem solving unit 1a transfers the information of product A to the problem solving unit 1a' to request scheduling (step s154).

Figure 17:
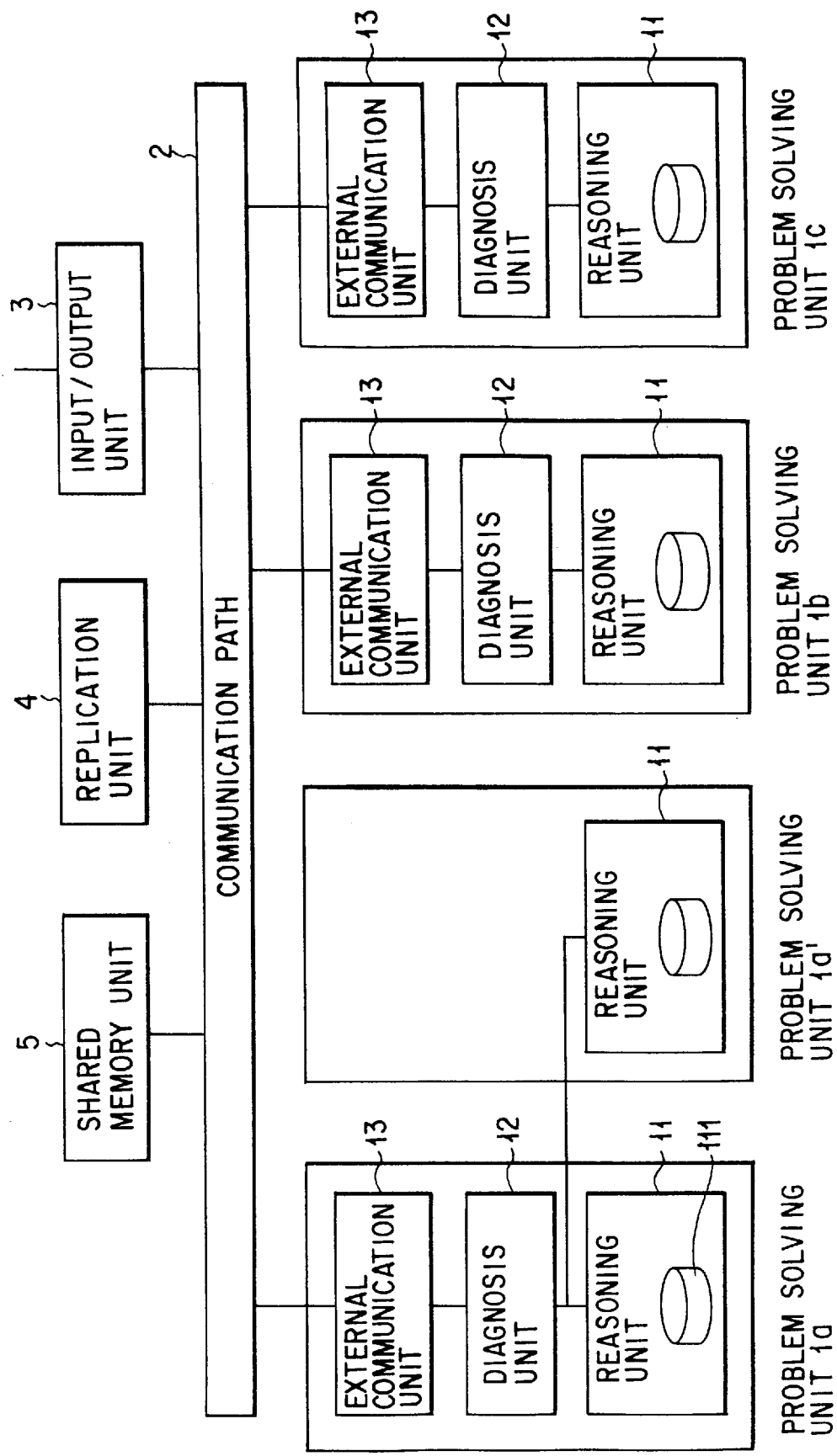
FIG. 17 is a block diagram showing the arrangement of the cooperative reasoning apparatus at the end of the processing shown in FIG. 14A.

The problem solving unit 1a' assures the work plan of the first step of product A in the work plan table of the lathe (step s162 in FIG. 16). Then, the problem solving unit 1a' adds the expected work end time (15 h) of the first step to the received information of product A (step s163), and transfers this information to the problem solving unit 1b as the scheduler of [second step: drilling machine] (step s164). The operation of the problem solving unit 1b is the same as that of the problem solving unit 1a. The problem solving unit 1b requests replication of the problem solving unit, and transfers the information of product A to the replicated problem solving unit to request scheduling. FIG. 17 is a block diagram showing the arrangement of the cooperative reasoning apparatus at that time. The problem solving unit 1a' replicated by the problem solving unit 1a is deleted upon completion of the requested scheduling.

A case will be explained below wherein the input/output unit 3 inputs information ([first step: form hole using drilling machine (1.0 h)], [second step: cut using lathe (2.5 h)], [third step: mill surface using milling machine (1.0 h), time limit for delivery=50 h later, quantity=8]) associated with product B.

Since the first step of product B shown in FIG. 14B uses the drilling machine, this information is transferred to the problem solving unit 1b as the scheduler of the drilling machine. The problem solving unit 1b requests the replication unit 4 to replicate a problem solving unit which can perform the same reasoning, and shares the work plan table of the drilling machine using the shared memory unit 5 with a replicated problem solving unit 1b'. Therefore, in this case, the work plan table of the drilling machine is shared by three units, i.e., the problem solving unit 1b, the problem solving unit 1b' which performs scheduling of product A, and a problem solving unit 1b". The problem solving unit 1b transfers the information associated with product B to the problem solving unit 1c to request scheduling.

Figure 18:
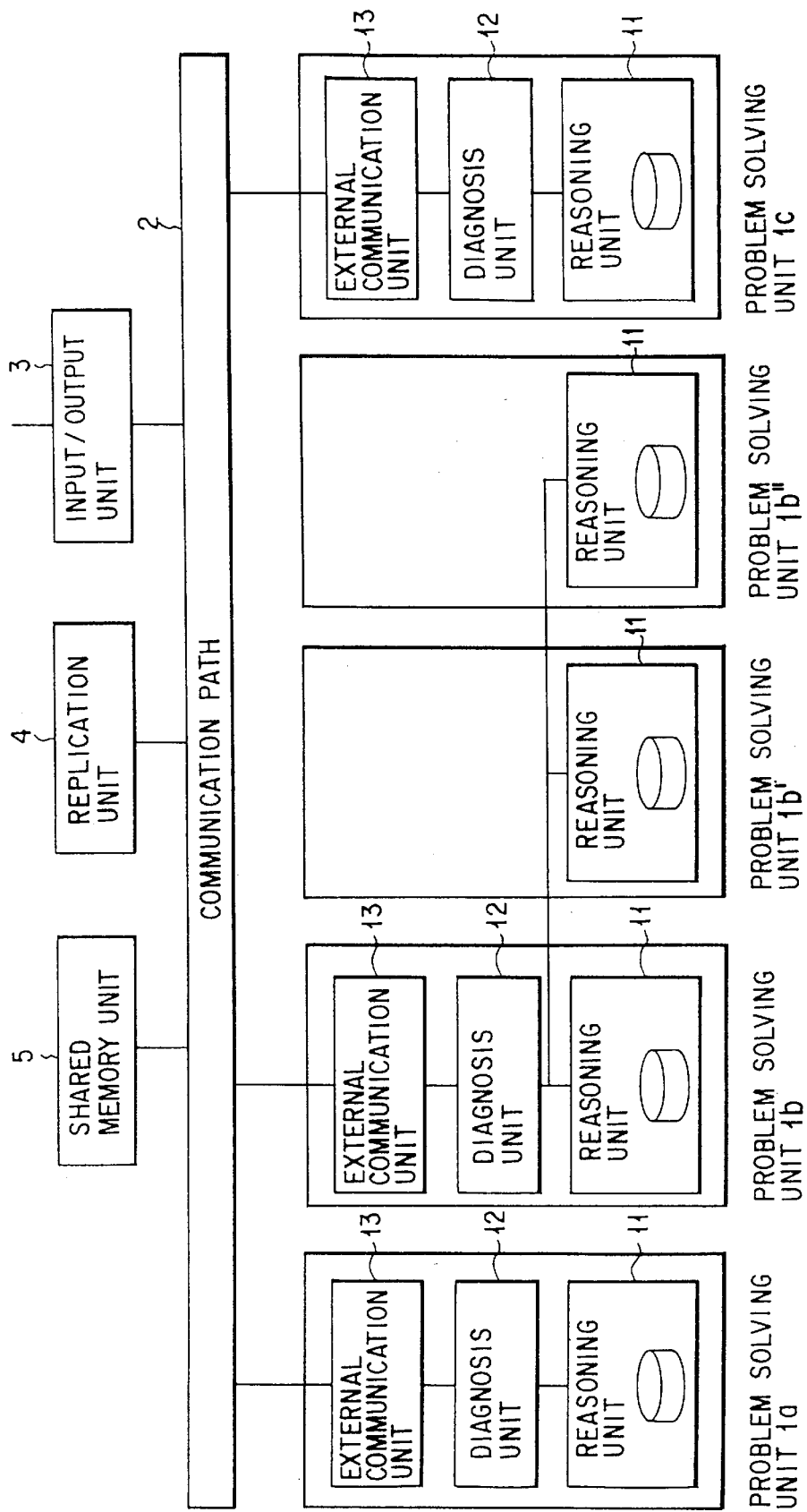
FIG. 18 is a block diagram showing the arrangement of the cooperative reasoning apparatus at the end of the processing shown in FIG. 14A.

FIG. 18 is a block diagram showing the cooperative reasoning apparatus at that time. The problem solving units 1b' and 1b" respectively make the work plans of the second step of product A and the first step of product B in the work plan table in their shared work plan table. In this case, since the expected work end time of the first step of product A is 15 h, the work time of the second step (20 h) of product A is assigned thereafter, and the first step of product B is assigned first.

Similarly, the information of product A added with the expected work end time (15+20=35 h) of the second step is transferred to the problem solving unit 1c as the scheduler of [third step: milling machine]. Finally, upon completion of scheduling of the problem solving unit 1c, the manufacturing plan (first step: lathe (0–15 h), second step: drilling machine (15 h–35 h), third step: milling machine (35 h–45 h)) associated with product A is completed.

The above-mentioned processing will be summarized below with reference to FIGS. 14A to 14C again. FIG. 14A shows a state wherein the input/output unit 3 inputs the information (first step: cut using lathe (1.5 h), second step: form hole using drilling machine (2.0 h), third step: mill surface using milling machine (1.0 h), time limit for delivery=80 h later, quantity=10) associated with product A, and the problem solving unit 1a is replicated to share the shared memory unit 5. FIG. 14B shows a state wherein the information associated with another product B is inputted during reasoning of the information associated with product A, and the problem solving unit 1b which is in charge of product B is replicated to share the shared memory unit 5. FIG. 14C shows a state wherein the problem is solved by the problem solving units, and a final reasoning result is obtained.

In this manner, according to the fourth embodiment, the present invention can be applied to production scheduling.

As described above, according to the present invention, in a cooperative reasoning apparatus mounted in a distributed computer environment such as a computer network, since a problem solving unit with a high load replicates itself, the concentration of processing operations on a single problem solving unit, and the delay of reasoning processing of a problem solving unit as a reasoning request source, and the like can be prevented. At the same time, since each problem solving unit can determine itself whether or not the problem solving unit is to be replicated, the concentration of information on the request source of reasoning processing can be avoided, resulting in efficient reasoning of a given problem.

Since the replicated problem solving unit or replicated reasoning unit is deleted, the computer can be prevented from being occupied by unnecessary problem solving units or reasoning units. Therefore, a problem solving unit suitable for a given problem can be efficiently used.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents. For example, the processing contents described in each of the embodiments may be pre-stored in a recording medium in the form of program code instructions, and may be read out and executed by a processor, as needed.

What is claimed is:

1. A cooperative reasoning apparatus comprising:
   a computer configured to execute a plurality of problem solving programs for cooperatively solving at least a first problem, the plurality of problem solving programs including a first problem solving program and a second problem solving program; and
   replication means for replicating at least one of the plurality of problem solving programs responsive to a replication request from the at least one of the plurality of problem solving programs,
   wherein the first problem solving program includes:
   first means for determining whether the first problem solving program can solve at least a portion of the first problem;
   first means for requesting, if the first problem solving program cannot solve the at least a portion of the first problem, the second problem solving program to solve the at least a portion of the first problem;
   second means for determining, responsive to receiving a request to solve a second problem from the second problem solving program, whether the first problem solving program is busy attempting to solve any problem; and second means for requesting the replication means to replicate the first problem solving program, if the first problem solving program is busy attempting to solve any problem and responsive to receiving in the first problem solving program the request to solve the second problem.

2. The apparatus of claim 1, wherein the first problem solving program further includes a table having information indicative of a type of problem that the first problem solving program is capable of solving.

3. The apparatus of claim 2, wherein the first means for determining is configured to refer to the table in order to determine whether the first problem solving program is capable of solving the first problem.

4. The apparatus of claim 2, wherein the second means for determining is configured to refer to the flag in order to determine whether the first problem solving program is attempting to solve the another problem.

5. The apparatus of claim 1, wherein the first problem solving program further includes a flag, the flag being configured to indicate whether the first problem solving program is attempting to solve any problem.

6. The apparatus of claim 1, wherein the first problem solving program further includes a timer for measuring a period of time that the first problem solving program is not attempting to solve any problem.

7. The apparatus of claim 6, wherein the first problem solving program further includes means for deleting the first problem solving program responsive to the period of time measured by the timer being greater than a predetermined period of time.

8. The apparatus of claim 1, wherein the first problem solving program further includes means for generating a message to be transferred to at least the second problem solving program.

9. The apparatus of claim 1, wherein the first problem solving program further includes means for analyzing a message transferred to the first problem solving program from at least the second problem solving program.

10. The apparatus of claim 1, further comprising a shared memory configured to store data shared by the first problem solving program and by at least one replicated problem solving program, the at least one replicated problem solving program being a replication of the first problem solving program replicated by the replication means.

11. The apparatus of claim 1, wherein the first problem solving program further includes:

means for announcing to the second problem solving program the at least a portion of the first problem, prior to requesting by the first means for requesting that the second problem solving program solve the at least a portion of the first problem; and means for accepting a bid offered by the second problem solving program for solving the at least a portion of the first problem, the bid being responsive to an announcement generated by the means for announcing.

12. The apparatus of claim 11, wherein the first problem solving program further includes:

means for determining, responsive to an announcement from the second problem solving program, whether the first problem solving program can solve a problem associated with the announcement from the second problem solving program, and means for offering a bid for the problem responsive to a determination that the first problem solving program can solve the problem associated with the announcement from the second problem solving program.

13. The cooperative reasoning apparatus of claim 1, wherein the cooperative reasoning apparatus is used for language translation, the first problem being a language translation problem.

14. The cooperative reasoning apparatus of claim 1, wherein the cooperative reasoning apparatus is used for production scheduling, the first problem being a production scheduling problem.

15. A cooperative reasoning method comprising:

providing a plurality of problem solving programs configured to execute on a computer and to cooperatively solve at least one problem, the plurality of problem solving programs including a first problem solving program;

providing a replication unit configured to replicate at least one of the plurality of problem solving programs responsive to a replication request from the at least one of the plurality of problem solving programs;

determining whether the first problem solving program can solve at least a portion of a first problem;

requesting, if the first problem solving program cannot solve the at least a portion of the first problems, at least one of the plurality of problem solving programs other than the first problem solving program to solve the at least a portion of the first problem;

determining, responsive to receiving in the first problem solving program a request to solve a second problem from at least one of the problem solving programs different than the first problem solving program, whether the first problem solving program is busy attempting to solve any problem; and requesting, if the first problem solving program is busy attempting to solve any problem and responsive to receiving in the first problem solving program the request to solve the second problem, the replication means to replicate the first problem solving program.

16. The cooperative reasoning method of claim 13, wherein the cooperative reasoning method is for language translation, the first problem being a language translation problem.

17. The cooperative reasoning method of claim 13, wherein the cooperative reasoning method is for production scheduling, the first problem being a production scheduling problem.

18. A storage medium having computer-executable program components stored thereon that perform cooperative reasoning when executed by a processor, the program components comprising:

means for providing a plurality of problem solving programs for cooperatively solving at least a first problem, each of the plurality of problem solving programs being configured to execute on a computer, the plurality of problem solving programs including a first problem solving program and a second problem solving program; and means for providing a replication unit for replicating at least one of the plurality of problem solving programs responsive to a replication request from the at least one of the plurality of problem solving programs, wherein the first problem solving program includes:

first means for determining whether the first problem solving program can solve at least a portion of the first problem;

first means for requesting, if the first problem solving program cannot solve the at least a portion of the first problem, the second problem solving program to solve the at least a portion of the first problem.

second means for determining, responsive to receiving a request to solve a second problem from the second problem solving program, whether the first problem solving program is busy attempting to solve any problem; and second means for requesting, if the first problem solving program is busy attempting to solve any problem and responsive to receiving in the first problem solving program the request to solve the second problem, the replication means to replicate the first problem solving program.

19. A method for improving computer efficiency in problem solving, the method comprising:

programming a computer to execute a plurality of problem solving programs cooperatively solving at least one problem, the plurality of problem solving programs including a first problem solving program;

programming the computer to execute a replication unit for replicating at least one of the plurality of problem solving programs responsive to a replication request from the at least one of the plurality of problem solving programs;

programming the computer to determine whether the first problem solving program can solve at least a portion of a first problem;

programming the computer to request, if the first problem solving program cannot solve the at least a portion of the first problem, at least one of the plurality of problem solving programs other than the first problem solving program to solve the at least a portion of the first problem;

programming the computer to determine, responsive to receiving in the first problem solving program a request to solve a second problem from at least one of the problem solving programs different than the first problem solving program, whether the first problem solving program is busy attempting to solve any problem; and programming the computer to request the replication means to replicate the first problem solving program if the first problem solving program is busy attempting to solve any problem and responsive to receiving in the first problem solving program the request to solve the second problem.

* * * * *